W. F. GEOGHEGAN.
HOISTING APPARATUS.
APPLICATION FILED JUNE 9, 1915.
Reissued Oct. 19, 1915. 13,996.
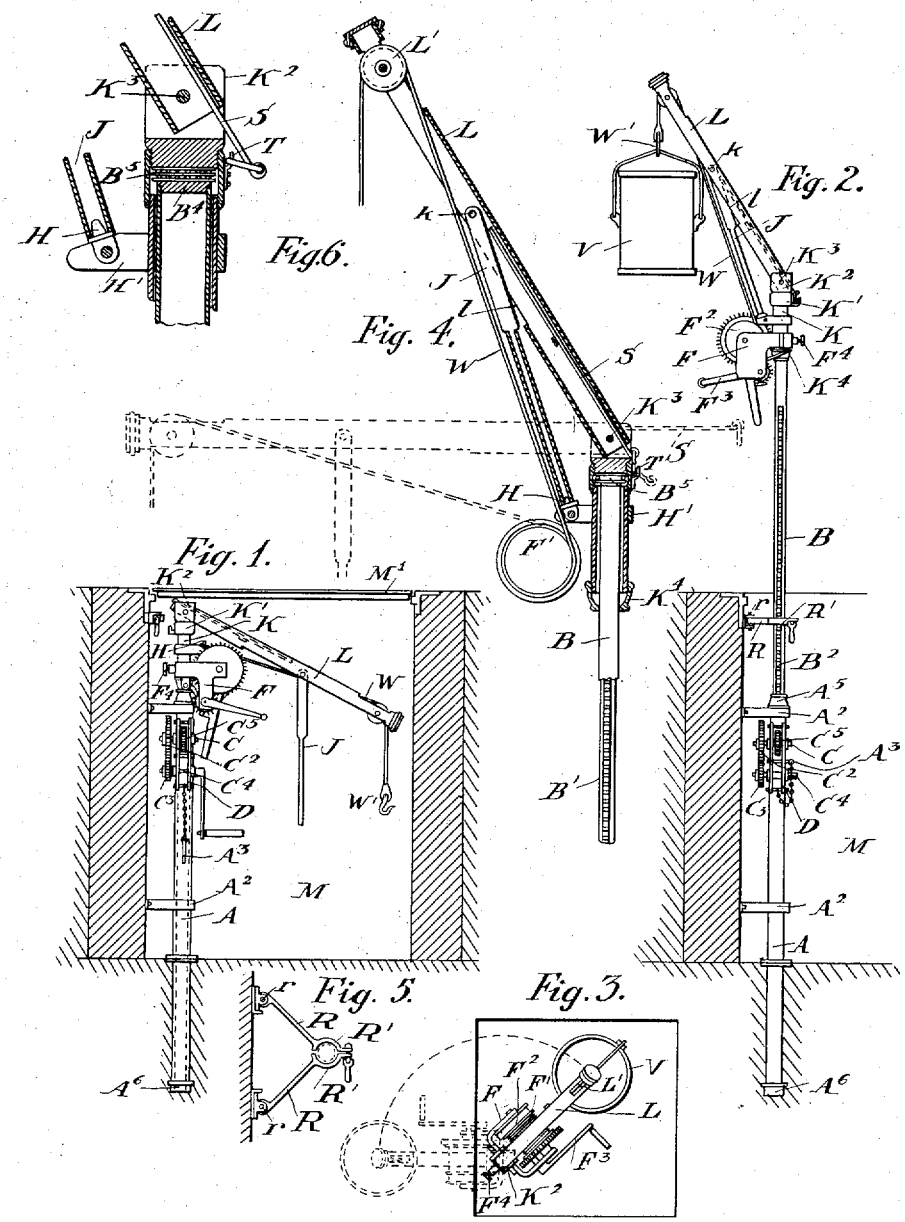
Witness:
Inventor
Walter F. Geoghegan,
By his Attorney
Charles R. Searle.

UNITED STATES PATENT OFFICE.

WALTER F. GEOGHEGAN, OF HUNTINGTON, NEW YORK, ASSIGNOR TO GILLIS & GEOGHEGAN, OF NEW YORK, N. Y., A FIRM.

HOISTING APPARATUS.

13,996. Specification of Reissued Letters Patent. Reissued Oct. 19, 1915.

Original No. 1,101,843, dated June 30, 1914, Serial No. 810,646. Application for reissue filed June 9, 1915. Serial No. 33,196.

*To all whom it may concern:*

Be it known that I, WALTER F. GEOGHEGAN, a citizen of the United States, residing at Huntington, in the county of Suffolk and State of New York, have invented a certain new and useful Improvement in Hoisting Apparatus, of which the following is a specification.

The invention is based upon the apparatus shown in Letters Patent No. 1,024,885, to Louis O. Forman.

The object of the invention is to provide an apparatus especially designed for transferring ashes from a cellar to a cart or other receptacle on the street level, and for analogous light service, in which the apparatus when collapsed will require but little vertical space, and when extended will permit the load to be lifted sufficiently above the street level for easy deposition in a cart, and so constructed as to be economically manufactured and installed, and easily and safely operated, in the limited space usually available for such structures.

The invention consists in certain novel features and details of construction and arrangement by which the above objects are attained, to be hereinafter described and claimed.

The accompanying drawings form a part of this specification and show the invention as it has been carried out in practice.

Figure 1 is a sectional view of the hoistway, showing the apparatus in elevation in the collapsed condition. Fig. 2 is a corresponding view, in the extended condition. Fig. 3 is a plan view. Fig. 4 is a vertical section, partly in elevation, showing the upper portion of the apparatus in the extended condition and on a larger scale. Fig. 5 is a plan view of a brace employed to steady the apparatus when in operation. Fig. 6 is a vertical section, partly in elevation, showing a portion of Fig. 4 on a still larger scale.

Similar letters of reference indicate the same parts in all the figures.

M is a hoistway below the street level, shown as having a cover $M^1$ which may be understood to be the usual horizontal doors.

A is a hollow post set in the floor of the hoistway and held in the vertical position by fixed braces $A^2$ secured to the adjacent wall. It carries an elevating mechanism consisting of a frame D in which is a crank-operated shaft $C^4$ carrying a pinion $C^3$ in mesh with a gear wheel $C^2$ on a shaft C on which is mounted a rack-wheel $C^5$ extending through a slot in the post and meshing with a rack $B^2$ on a core $B^1$ inclosed in and secured to a tubular standard B arranged to slide telescopically in the post. When fully raised the standard is supported positively by inserting a pin $A^3$ through suitable holes, not shown, in the post below the lower end of the standard and upon which the latter rests. The upper end of the standard is inclosed by a sleeve K arranged to rotate on the standard and having at its upper end a vertical coupling $K^1$ in which is screwed a bifurcated head $K^2$ carrying a tubular crane-arm or jib L pivotally mounted on the bolt $K^3$ and capable of swinging vertically thereon.

At the upper end of the standard B is a plug $B^4$ having a plane upper face upon which rests the lower plate of a horizontal ball-bearing $B^5$ the upper plate of which receives the plane under face of the head $K^2$ and thus supports the sleeve with its connections antifrictionally upon the standard with freedom to rotate thereon when required. On the lower end of the sleeve is a reducer $K^4$ adapted to embrace the standard closely, and $A^5$ is a similar reducer on the upper end of the post A, serving as a guide for the standard.

Mounted on the sleeve K is a frame F carrying a winding mechanism having a drum $F^1$ and brake-drum $F^2$ operated by a crank $F^3$. It takes up the rope W extending over the sheave $L^1$ and carrying a hook $W^1$ by which the ash can V or other load is hoisted, and has a pin $F^4$ arranged to extend through the sleeve into the standard and thus hold the sleeve against rotation during the hoisting operation, and to be withdrawn to permit the sleeve and its load to be rotated in depositing the load.

The jib L is slotted to receive the sheave $L^1$ at its outer end, and also carries a strut J pivotally connected to the jib on the interior of the latter at *k*, and having its tubular free lower end constructed to serve as a socket in connection with a spur H mounted on a yoke $H^1$ secured to the sleeve K. The jib is slotted as at *l* to permit the strut to swing therein to the extent required, and when the jib is raised at an angle and its strut J seated on the spur H, it is stiffly supported, the strut serving as a brace.

When the apparatus is collapsed, as in Fig. 1, the jib drops at an angle, with the strut depending idly therefrom, but when the apparatus is extended, the jib is lifted by hand and the strut seated on its spur, and a considerable additional elevation of the load is attained without increasing the normal height of the apparatus, an important item in mechanism of this class in which the available height of closed hoistway is usually limited.

To facilitate the lifting of the jib with its sheave and strut to the desired angular position, a sliding bar S is inclosed in the tubular jib, arranged to be drawn out through the head $K^2$, as shown in dotted lines in Fig. 4, and serve as a lever by which the jib may be swung upwardly on the bolt $K^3$ as a fulcrum; when thus elevated the strut swings by gravity toward its spur and is easily engaged therewith. The bar S may then be thrust into the jib so as to be out of the way of the operator, and held against accidental withdrawal by any suitable latch, shown as a loop or ring loosely mounted in the outer end of the bar, engaged upon a hook T on the coupling $K^1$ or on any convenient portion of the sleeve. The pin $F^4$ serves in holding the hoisting mechanism firmly when required, and on withdrawal permits the sleeve to rotate on the ball-bearing $B^5$ and carry the load to any point in the arc described by the jib.

The length of the standard is so proportioned relatively to the length of the post A as to rest upon the interior of the cap $A^6$ which is screwed upon the lower end of the post, when the standard is in its lowest collapsed position, coming to rest on such cap when the reducer $K^4$ on the sleeve reaches or nearly reaches the reducer $A^5$ on the post, so that no vertical space is wasted and the desired height of lift is attained with a comparatively short post and standard.

To steady the standard laterally during the hoisting operation, a removable brace is employed consisting of the arms R R pivotally connected to the adjacent wall of the hoistway at any available high point thereon, as at *r r*, each carrying at its outer end a semicircular portion $R^1$ adapted when brought together about the standard to form a ring inclosing the latter, and be clamped thereon when the standard is elevated and aid in maintaining the vertical position.

I claim:—

1. In an apparatus of the character set forth, a standard, means for raising and lowering the same, a rotatable member on the upper end of said standard, a jib pivotally mounted to swing vertically, means movable relatively to the jib to serve as a lever for lifting the same and detachable means between said member and jib for holding the latter at an angle relatively to the former.

2. In an apparatus of the character set forth, a standard, means for raising and lowering the same, a rotatable member on the upper end of said standard, a jib pivotally mounted to swing vertically, means movable relatively to the jib to serve as a lever for lifting the same, detachable means between said member and jib for holding the latter at an angle relatively to the former, and a winding mechanism carried by said member.

3. In an apparatus of the character set forth, a standard, means for raising and lowering the same, a sleeve loosely inclosing the upper end of said standard, a head at the upper end of said sleeve, a winding mechanism carried by said sleeve, a jib pivotally mounted to swing vertically, means movable relatively to the jib to serve as a lever for lifting the same and means for detachably connecting the sleeve and jib.

4. In an apparatus of the character set forth, a standard, means for raising and lowering the same, a jib pivotally mounted to swing vertically, a strut for supporting said jib, and means movably mounted in said jib and arranged to be withdrawn partially therefrom to serve as a lever for lifting said jib.

5. In an apparatus of the character set forth, a standard, means for raising and lowering the same, a rotatable member on the upper end of said standard, a winding mechanism carried by said member, a jib pivotally mounted for movement with the rotatable member, and means slidable within the jib and adapted to serve as a lever for swinging the jib upward on its pivot.

6. In an apparatus of the character set forth, a standard, means for raising and lowering the same, a rotatable member on the upper end of said standard, a winding mechanism carried by said member, a jib pivotally mounted for movement with the rotatable member, means slidable within the jib and adapted to serve as a lever for swinging the jib upward on its pivot, and a strut pivotally mounted on the jib for supporting the latter in elevated position.

7. In an apparatus of the character set forth, a standard, means for raising and lowering the same, a rotatable member mounted on the standard, a jib mounted on said rotatable member, a member movable relatively to the jib and means pivotally connected to the said last-named member for moving the same lengthwise of the jib as the latter is raised and lowered, and a winding mechanism carried by said rotatable member.

8. In an apparatus of the character set forth, a standard, means for raising and lowering the same, a rotatable member at the upper end of said standard, a winding mechanism carried by said rotatable member, a longitudinally slotted jib pivotally mounted on said rotatable member, and strut-bracing means carried by said rotatable member and partially receivable within the slot of said jib.

9. In an apparatus of the character set forth, a standard, means for raising and lowering the same, a rotatable member at the upper end of said standard, a winding mechanism carried by said rotatable member, a jib pivotally mounted on said rotatable member, means serving as a lever for lifting the jib and a strut pivotally mounted at one end on said jib and connected with means movable relatively to said jib.

10. In an apparatus of the character set forth, a hollow post, a standard arranged to slide telescopically therein, means for raising and lowering said standard, a sleeve loosely inclosing the upper end of said standard, a head at the upper end of said sleeve, a ball-bearing between the top of said standard and said head and arranged to support said sleeve, a jib pivotally mounted in said head to swing vertically thereon, and detachable means between said sleeve and jib for holding the latter at an angle relatively to said sleeve.

11. In an apparatus of the character set forth, a hollow post, a standard arranged to slide telescopically therein, means for raising and lowering said standard, a sleeve loosely inclosing the upper end of said standard, a head at the upper end of said sleeve, a ball-bearing between the top of said standard and said head and arranged to support said sleeve, a winding mechanism carried by said sleeve, a jib pivotally mounted in said head to swing vertically thereon, and a strut carried by said jib, and means for detachably connecting said strut to said sleeve.

12. In an apparatus of the character set forth, a hollow post, a standard arranged to slide telescopically therein, means for raising and lowering said standard, a sleeve loosely inclosing the upper end of said standard, a jib pivotally mounted on said sleeve and arranged to swing vertically, a strut pivotally mounted in said jib and having a socket at its lower end, and a spur carried by said sleeve and arranged to receive such socket and support said strut and jib.

13. In an apparatus of the character set forth, a hollow post, a standard arranged to slide telescopically therein, means for raising and lowering said standard, a jib pivotally mounted at the upper end of said standard and arranged to swing vertically, a strut pivotally mounted in said jib and adapted to support the latter, and a bar slidably mounted in said jib and arranged to be withdrawn partially therefrom to serve as a lever in lifting said jib and engaging said strut.

14. In an apparatus of the character set forth, a hollow post, a standard arranged to slide telescopically therein, means for raising and lowering said standard, a jib pivotally mounted at the upper end of said standard and arranged to swing vertically, a strut pivotally mounted in said jib, a spur carried by said standard and arranged to engage said strut and support said jib, and a bar slidably mounted in said jib and arranged to be withdrawn partially therefrom to serve as a lever in lifting said jib and engaging said strut and spur, and means for holding said bar against withdrawal.

WALTER F. GEOGHEGAN.

Copies of this patent may be obtained for five cents each, by addressing the "Commissioner of Patents, Washington, D. C."